Patented Dec. 19, 1950

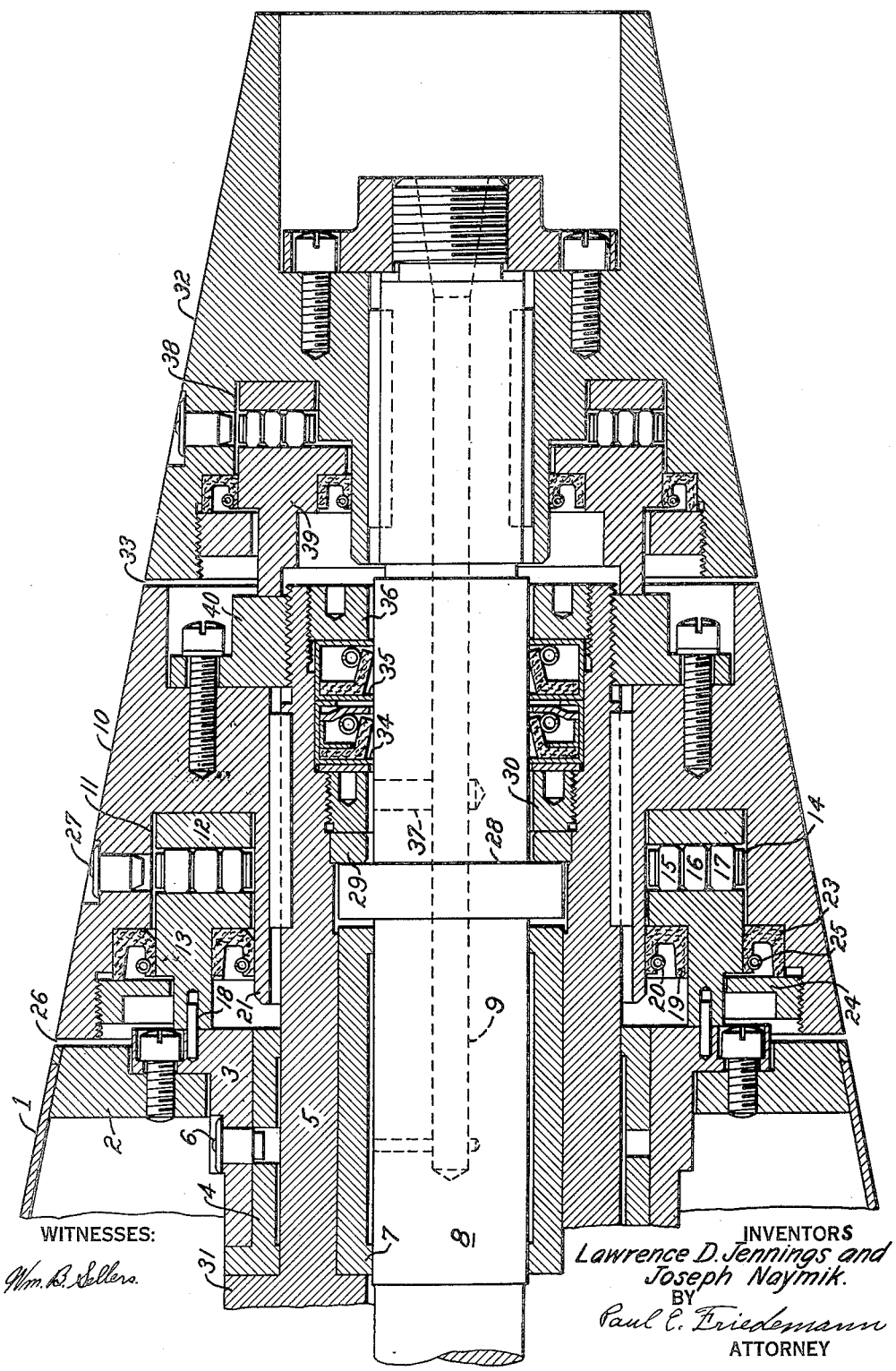

2,534,910

UNITED STATES PATENT OFFICE 2,534,910

THRUST BEARING

Lawrence D. Jennings and Joseph Naymik, Sharon, Pa., assignors to Westinghouse Electric Corporation, East Pittsburgh, Pa., a corporation of Pennsylvania Application March 8, 1946, Serial No. 653,192

8 Claims. (Cl. 308—234)

Our invention relates to thrust bearings and more particularly to thrust bearings of the high-speed roller bearing type.

The Government of the United States has been granted a certain royalty-free license for governmental purposes with respect to the invention disclosed herein.

In torpedoes in use prior to the present invention, sea water was admitted to the tail cone housing the differential gears used with two-propeller torpedoes. The admission of water into the tail cone consumed propulsive power since the water used in the gears as a lubricant was subjected to considerable churning. The maximum speed could, therefore, not be obtained from a given propulsion equipment.

One broad object of our invention is to obtain the maximum propulsive effect from a given propulsion equipment of a torpedo.

Another broad object of our invention is the provision of roller type thrust bearings for two concentric shafts without subjecting the shafts to end thrust.

A still further broad object of our invention is the provision of a leak-proof roller type thrust bearing.

A more specific object of our invention is the provision of a tail cone of a torpedo sealed off from the sea at the forward hub of the forward propeller and thrust bearings of the roller bearing type for each of the two propellers for transmitting the thrust directly to the tail cone and not the propulsion shafts.

Other objects and advantages of our invention will become more apparent from a study of the following specification and the accompanying drawing, in which:

The single figure is a longitudinal sectional view of the aft end of the tail cone of a torpedo and the hubs and thrust bearings for the two propellers of a torpedo.

In the figure, 1 designates the aft end of the tail cone of a torpedo provided with the annular inwardly projecting bulkhead flange 2. The flanged sleeve member 3 is shrunk-fit to the sleeve bearing 4, and is bolted to the bulkhead flange 2. The sleeve bearing 4 at its ends fits snugly about the shaft 5. By reason of the fit and the lubricant supplied through fitting 6 to the space between the bearing 4 and shaft 5 a substantially liquid tight seal is provided.

A second sleeve bearing 7 is shrunk-fit to the inner surface of shaft 5 so that this bearing in operation rotates with shaft 5. The sleeve bearing 7 is similar in structure to bearing 4 and thus at its ends fits snugly against the shaft 8. The lubricant retaining space is supplied with lubricant through the axial channel 9 provided with a suitable grease cup (not shown) at the aft end of shaft 8.

The shaft 5 is keyed to the forward propeller hub 10. The hub 10 is provided with an annular recess 11 having the thrust transmitting ring 12 at the bottom. A thrust receiving ring 13, shaped as shown, is also disposed in the recess 11. A roller bearing race 14 is disposed between the rings 12 and 13. The roller bearing race houses a relatively large number of radially disposed rollers each radial roller unit being built up of a plurality of relatively short individual rollers, as 15, 16 and 17. With this construction, particularly since the respective rollers are rounded off at the regions in contact with the rings 12 and 13, a minimum of sliding friction is encountered. In operation a relatively large sliding friction would be encountered if each radial unit constituted a single elongated roller.

The thrust receiving member 13 at the forward end engages the flange of the sleeve member 3 and by a plurality of dowel pins 18 is fixed relative to the sleeve member 3.

An annular gasket 19, U-shaped in section and of rubber, or Neoprene, is firmly disposed against the inner annular surface of member 13 and is held in liquid sealing engagement by garter spring 20 with the sleeve-like extension 21 of the hub 10. A gasket 23, similar in structure and function to gasket 19, is firmly held on the shoulder of the recess 11 in the hub 10. An annular nut 24 aids in holding the gasket 23 fixed to the hub and a garter spring 25 holds the inner position of the gasket 23 in liquid sealing engagement with the thrust receiving member 13.

From the structure and function of the elements just discussed, it is apparent that sea water entering at the spacing 26 is prevented from entering the region occupied by the roller bearing race disposed between the rings 12 and 13. Lubrication is supplied to the roller bearings through the fittings 27.

From the foregoing, it is apparent that the thrust of the forward propeller secured to hub 10 is transmitted from the hub 10 through the ring 12, the roller bearings, and ring 13 directly to the very end of the tail cone, that is, to the bulkhead flange 2.

The shaft 8 is provided with a shoulder 28 which is either integral with the shaft or shrunk-fit to it. The aft end of shaft 5 is internally threaded at two places and provided with shoulders, as shown. A thrust-receiving ring 29 is held in place on a shoulder in shaft 5 by the annular nut 30. This construction prevents any aft movement of shaft 8 with reference to shaft 5. Shaft 5 is prevented from moving in the aft direction by the shoulder 31 on shaft 5 engaging the sleeve bearing 4. The spacing between the tail cone and hub 10 is thus fixed at 26 and the spacing between the hub 10 and the hub 32 is thus fixed at 33.

Disposed between nut 30 and the end of shaft 5 are a plurality of shaft seals, as 34 and 35, of well known design held in place by the externally threaded sleeve nut 36 engaging internal threads on shaft 5. An effective liquid seal is thus provided between shafts 5 and 8 so that no sea water, entering at 33, can move forward along the external surface of shaft 8. Lubrication is supplied to the shaft seals 34 and 35 through conduit 37 having communication with the axial channel 9.

The hub 32 is keyed to the aft end of shaft 8. The forward surface of the hub 32 is provided with a recess 38, similar to recess 11 in hub 10, and a thrust roller bearing assembly, similar in structure and function to the bearing assembly in recess 11, is mounted in this recess 35. The design is, however, somewhat smaller since this latter bearing assembly is called upon to transmit the thrust of the aft propeller only whereas the bearing assembly in recess 11 transmits the thrust of both propellers. This will be apparent from the fact that the thrust receiving member 39 slidably engages the thrust receiving ring 40 bolted, as shown, to the hub 10. The ring 40 is also, as shown, threaded onto the aft end of shaft 5.

From the discussion of the construction and function of our bearing assembly hereinbefore made, it is apparent that no sea water can enter the tail cone and that water is nowhere used as a lubricant, nor is the propulsion equipment called upon to churn water about. A very appreciable increase in torpedo speed is thus obtained from propulsion equipment no larger than heretofore in use. Further, the construction makes possible the use of propulsion equipment of greater power.

We claim as our invention:

1. In a thrust bearing, in combination, a base having a flat surface, a shaft rotatably mounted in the base and with its axis disposed normal to the flat surface, said shaft having an end projecting beyond the flat surface, a hub secured to the shaft at the projecting end, an annular recess in the hub in the surface of the hub facing the flat surface, a thrust receiving ring in the bottom of the recess, a roller bearing race disposed in the recess against the ring, said roller bearing race housing a plurality of radially disposed roller units, a thrust receiving ring disposed against the rollers, annular sealing means, being U-shaped in section, disposed in said recess with the open end of the U being directed toward the flat surface and with the outer leg of the U snugly engaging the hub and the other leg similarly engaging the thrust receiving ring, whereby said sealing means prevents any fluid, disposed between the hub and the flat surface of the base, from entering the region of the recess occupied by the roller bearing race, said thrust receiving ring being disposed to engage the flat surface of the base to thus transmit the thrust on the hub to the base.

2. In a thrust bearing, in combination, a base having a flat surface, a shaft rotatably mounted in the base and with its axis disposed normal to the flat surface, said shaft having an end projecting beyond the flat surface, a hub secured to the shaft at the projecting end, an annular recess in the hub in the surface of the hub facing the flat surface, a thrust receiving ring in the bottom of the recess, a roller bearing race disposed in the recess against the ring, said roller bearing race housing a plurality of radially disposed roller units, each unit comprising a plurality of radially aligned rollers, a thrust receiving ring disposed against the rollers, annular sealing means, being U-shaped in section, disposed in said recess with the open end of the U being directed toward the flat surface and with the outer leg of the U snugly engaging the hub and the other leg similarly engaging the thrust receiving ring, a garter spring firmly holding the other leg against the thrust receiving ring, whereby said sealing means prevents any fluid, disposed between the hub and the flat surface of the base, from entering the region of the recess occupied by the roller bearing race, said thrust receiving ring being disposed to engage the flat surface of the base to thus transmit the thrust on the hub to the base.

3. In a thrust bearing, in combination, a base, a shaft mounted in a bearing in the base and at one end projecting from the base, a hub secured to the projecting end, the characteristics of the load driven by the shaft through the hub being such that the shaft is subjected to an axial thrust toward the base, said hub being provided with an annular recess in uniformly spaced relation radially of the surface of the shaft, a thrust transmitting ring in the base of the recess, a thrust receiving ring in the recess in spaced relation to the thrust transmitting ring, said second ring being, at the surface remote from the bottom of the recess, secured to the base, a plurality of radially disposed rollers in the space between the thrust receiving ring and the thrust transmitting ring, a liquid seal disposed at the outer periphery of the second ring engaging both the ring and the outer wall of the recess, a second liquid seal disposed at the inner periphery of the second ring and engaging both the second ring and the inner wall of the recess, whereby liquid is prevented from entering the region occupied by the rollers and the end thrust on the shaft is transmitted by the second ring to the base and no end thrust is applied to the shaft bearing.

4. In a thrust bearing, in combination, a base, a shaft mounted in a bearing in the base and at one end projecting from the base, a hub secured to the projecting end, the characteristics of the load driven by the shaft through the hub being such that the shaft is subjected to an axial thrust toward the base, said hub being provided with an annular recess in uniformly spaced relation radially of the surface of the shaft, a thrust transmitting ring in the base of the recess, a thrust receiving ring in the recess in spaced relation to the thrust transmitting ring, said second ring being, at the surface remote from the bottom of the recess, by means of dowel pins to provide for some axial movement but no rotary movement of the second ring, secured to the base, a plurality of radially disposed rollers in the space between the thrust receiving ring and the thrust transmitting ring, a liquid seal disposed at the outer periphery of the second ring engaging both the ring and the outer wall of the recess, a second liquid seal disposed at the inner periphery of the second ring and engaging both the second ring and the inner wall of the recess, whereby liquid is prevented from entering the region occupied by the rollers and the end thrust on the shaft is transmitted by the second ring to the base and no end thrust is applied to the shaft bearing.

5. In a thrust bearing, in combination, a base having a flat surface, a shaft, a bearing for the shaft, said bearing and shaft being so disposed that an end of the shaft projects from the base at right angles to the flat surface of the base, a hub fixed on the projecting end of the shaft, said hub being coupled to a load producing an axial thrust on the shaft in the direction of the base, said hub being provided with an annular recess in the surface of the hub facing the flat surface of the base, the recess being concentric to the shaft and spaced from the shaft, a thrust transmitting ring in the base of the recess, a thrust receiving ring in the recess disposed in spaced relation to the thrust receiving ring, a roller bearing race disposed in the space between the rings, said roller bearing race housing a plurality of radially disposed roller units, said thrust transmitting ring being dimensioned to project out of the recess to directly engage the flat surface to thus transmit the end thrust to the flat surface of the base.

6. In a thrust bearing, in combination, a base having a flat surface, a shaft, a bearing for the shaft, said bearing and shaft being so disposed that an end of the shaft projects from the base at right angles to the flat surface of the base, a hub fixed on the projecting end of the shaft, said hub being coupled to a load producing an axial thrust on the shaft in the direction of the base, said hub being provided with an annular recess in the surface of the hub facing the flat surface of the base, the recess being concentric to the shaft and spaced from the shaft, a thrust transmitting ring in the base of the recess, a thrust receiving ring in the recess disposed in spaced relation to the thrust receiving ring, a roller bearing race disposed in the space between the rings, said roller bearing race housing a plurality of radially disposed roller units, a rubber-like sealing ring, disposed on the outer surface of the second ring and engaging the hub and held in place on this ring by a garter spring, providing a liquid seal, a similar seal at the inner surface of the second ring, said thrust transmitting ring being dimensioned to project out of the recess to directly engage the flat surface to thus transmit the end thrust to the flat surface of the base.

7. In an assembly for transmitting the end thrusts on a pair of concentric shafts directly to the base in which the shafts are mounted and not to the bearings for the shafts, in combination, a base, a pair of concentric shafts mounted in bearings in the base and projecting from the base at right angles to a flat surface on the base, a hub mounted on the outer shaft in facing relation to the flat surface, a hub mounted on the inner shaft in facing relation to the aft end of the first hub, a recess in the first hub disposed in concentric spaced relation to the outer shaft and disposed in the surface of the hub facing the flat surface on the base, a thrust receiving ring in the base of the recess, a thrust transmitting ring disposed in the recess in spaced relation to the first ring, a roller bearing assembly, including a plurality of roller units each radially disposed with reference to the axis of the shafts and each unit comprising a plurality of radially aligned rollers, disposed in the space between the two rings, a similar arrangement in the hub secured to the inner shaft, whereby the end thrust on the inner shaft is transmitted to the hub on the outer shaft and the end thrust on both shafts is transmitted from the second hub to the flat surface on the base.

8. In an assembly for transmitting the end thrust on a pair of concentric shafts directly to the base in which the shafts are mounted and not to the bearings for the shafts, in combination, a base, a pair of concentric shafts mounted in bearings in the base and projecting from the base at right angles to a flat surface on the base, a hub mounted on the outer shaft in facing relation to the flat surface, a hub mounted on the inner shaft in facing relation to the aft end of the first hub, a recess in the first hub disposed in concentric spaced relation to the outer shaft and disposed in the surface of the hub facing the flat surface on the base, a thrust receiving ring in the base of the recess, a thrust transmitting ring disposed in the recess in spaced relation to the first ring, a roller bearing assembly, including a plurality of roller units each radially disposed with reference to the axis of the shafts and each unit comprising a plurality of radially aligned rollers, disposed in the space between the two rings, a similar arrangement in the hub secured to the inner shaft, whereby the end thrust on the inner shaft is transmitted to the hub on the outer shaft and the end thrust on both shafts is transmitted from the second hub to the flat surface on the base, means for securing the second ring in the recess of the first hub against rotation with reference to the base, and sealing means for preventing liquid from entering the region of the rollers in the recesses.

LAWRENCE D. JENNINGS.
JOSEPH NAYMIK.

REFERENCES CITED

The following references are of record in the file of this patent:

UNITED STATES PATENTS

| Number | Name | Date |
|---|---|---|
| 1,022,307 | Eberhart | Apr. 2, 1912 |
| 1,300,385 | Hart | Apr. 15, 1919 |
| 1,993,900 | Rumpel | Mar. 12, 1935 |
| 2,050,283 | Dixon | Aug. 11, 1936 |
| 2,148,313 | Williams | Feb. 21, 1939 |